United States Patent
Kobayashi et al.

(10) Patent No.: US 8,424,908 B2
(45) Date of Patent: Apr. 23, 2013

(54) GAS GENERATOR FOR RESTRAINING DEVICE OF VEHICLE

(75) Inventors: Tomoharu Kobayashi, Tatsuno (JP); Naoki Matsuda, Tatsuno (JP); Osamu Fukawatase, Toyota (JP); Tomoko Kurata, Tsuchiura (JP); Yuki Nonoyama, Kiyosu (JP); Tadashi Yamada, Kiyosu (JP); Toru Ozaki, Kiyosu (JP)

(73) Assignees: Daicel Chemical Industries, Ltd., Osaka-Shi, Osaka (JP); Toyota Jidosha Kabushiki Kaisha, Toyota-Shi, Aichi (JP); Toyoda Gosei Co., Ltd., Koyosu-Shi, Aichi (JP)

( * ) Notice: Subject to any disclaimer, the term of this patent is extended or adjusted under 35 U.S.C. 154(b) by 0 days.

(21) Appl. No.: 13/059,652

(22) PCT Filed: Jan. 14, 2010

(86) PCT No.: PCT/JP2010/050663
§ 371 (c)(1),
(2), (4) Date: Apr. 28, 2011

(87) PCT Pub. No.: WO2010/082683
PCT Pub. Date: Jul. 22, 2010

(65) Prior Publication Data
US 2011/0259234 A1    Oct. 27, 2011

(30) Foreign Application Priority Data

Jan. 15, 2009   (JP) ................. 2009-006743

(51) Int. Cl.
*B60R 21/26*    (2006.01)
(52) U.S. Cl.
USPC ............................ 280/741; 280/736; 102/530

(58) Field of Classification Search .................. 102/530, 102/531; 280/736, 741
See application file for complete search history.

(56) References Cited

U.S. PATENT DOCUMENTS 4,296,084 A  * 10/1981  Adams et al. ................. 423/351
5,048,862 A    9/1991   Bender et al.
(Continued)

FOREIGN PATENT DOCUMENTS

| CN | 101041345 A | 9/2007 |
|---|---|---|
| DE | 198 12 221 A1 | 9/1998 |

(Continued)

OTHER PUBLICATIONS

Chinese Office Action issued in Chinese Patent Application No. 201080002346.5 on Oct. 17, 2012.
Chinese Office Action issued in Chinese Patent Application No. 201080004389.7 on Nov. 23, 2012.

*Primary Examiner* — Daniel J Troy
(74) *Attorney, Agent, or Firm* — Birch, Stewart, Kolasch & Birch, LLP

(57) ABSTRACT

A gas generator, includes: a housing having closure shell, a diffuser shell including a gas discharge ports, and a flange portion; an inner tube member defining a combustion chamber in an outside thereof for accommodating a gas generating agent,
 the igniter being attached to the closure shell such that the igniter projects inside from a hole formed in the bottom plate of the closure shell,
 the annular porous member having a plurality of holes which are smaller than the size of the gas generator, defining a space above the combustion chamber,
 a total opening area ($A_1$) of the gas discharge ports being smaller than a total opening area ($A_2$) of a gas pathway extending from the combustion chamber to the gas discharge ports ($A_1 < A_2$), and
 the space and the gas discharge path being communicated with each other by a communicating portion.

6 Claims, 2 Drawing Sheets

U.S. PATENT DOCUMENTS

| | | | |
|---|---|---|---|
| 5,087,070 A | 2/1992 | O'Loughlin et al. |
| 5,458,371 A | 10/1995 | Fulmer et al. |
| 5,564,741 A | 10/1996 | Ward et al. |
| 5,582,427 A | 12/1996 | Rink et al. |
| 5,951,040 A | 9/1999 | McFarland et al. |
| 5,984,352 A | 11/1999 | Green, Jr. et al. |
| 6,126,197 A | 10/2000 | Muir et al. |
| 6,142,515 A | 11/2000 | Mika |
| 6,227,565 B1 | 5/2001 | McFarland et al. |
| 6,234,521 B1 | 5/2001 | Katsuda et al. |
| 6,942,249 B2 | 9/2005 | Iwai et al. |
| 7,267,365 B2 | 9/2007 | Quioc |
| 7,591,483 B2 | 9/2009 | Nakayasu et al. |
| 7,600,783 B2 | 10/2009 | Numoto et al. |
| 7,763,092 B2 | 7/2010 | Koyama et al. |
| 7,806,954 B2 | 10/2010 | Quioc |
| 2003/0051630 A1 | 3/2003 | Katsuda et al. |
| 2003/0137139 A1 | 7/2003 | Iwai et al. |
| 2004/0155444 A1 | 8/2004 | Matsuda et al. |
| 2005/0001414 A1 | 1/2005 | Matsuda et al. |
| 2007/0063494 A1 | 3/2007 | Saito et al. |
| 2007/0095035 A1 | 5/2007 | Quioc |
| 2007/0222195 A1 | 9/2007 | Yabuta et al. |
| 2008/0118408 A1 | 5/2008 | Numoto et al. |
| 2010/0117344 A1 | 5/2010 | Windhausen et al. |

FOREIGN PATENT DOCUMENTS

| | | |
|---|---|---|
| DE | 100 02 799 A1 | 1/2001 |
| DE | 10 2007 052 828 A1 | 5/2008 |
| DE | 10 2007 033 344 A1 | 5/2009 |
| EP | 0 012 626 A1 | 6/1980 |
| EP | 1 127 753 A1 | 8/2001 |
| EP | 1 671 856 A1 | 6/2006 |
| EP | 1 837 253 A1 | 9/2007 |
| FR | 2 922 007 A1 | 4/2009 |
| GB | 2 022 194 A | 12/1979 |
| JP | 5-213147 A | 8/1993 |
| JP | 3004037 U | 11/1994 |
| JP | 10-95302 A | 4/1998 |
| JP | 2000-198409 A | 7/2000 |
| JP | 2001-301561 A | 10/2001 |
| JP | 2005-53382 A | 3/2005 |
| JP | 2005-193762 A | 7/2005 |
| JP | 3122258 U | 6/2006 |
| JP | 3122259 U | 6/2006 |
| JP | 2007-15573 A | 1/2007 |
| JP | 2008-114718 A | 5/2008 |
| WO | WO 94-25315 A1 | 11/1994 |
| WO | WO 2009/043904 A2 | 4/2009 |

* cited by examiner

GAS GENERATOR FOR RESTRAINING DEVICE OF VEHICLE

BACKGROUND OF THE INVENTION

1. Field of the Invention

The present invention relates to a gas generator for a restraining device of a vehicle, such as an airbag apparatus.

2. Description of the Related Art

A gas regenerator using a gas generating agent needs a filter for cooling and filtering combustion gas generated from the gas generating agent. However, the large volume of the filter is the cause of the increase in mass or volume of the entire gas generator, thus there is an attempt to reduce the mass and volume of the filter.

JP-U No. 3,004,037 discloses a gas generator that eliminates a first cooling filter 20 shown in FIG. 8 by disposing a baffle member 36 within a first slag capturing chamber 50 in FIG. 1.

SUMMARY OF THE INVENTION

The present invention provides a gas generator for a restraining device of a vehicle, including:

a housing formed by a cup-shaped closure shell, a cup-shaped diffuser shell having a plurality of gas discharge ports on a side surface portion thereof, and a flange portion having a hole for fixing;

a cup-shaped inner tube member disposed inside the housing, defining therein an ignition device chamber for accommodating an igniter coaxially with a central axis of the housing, and defining, in an outside thereof, a combustion chamber charged with a gas generating agent;

no filter for cooling and filtering a gas generated by combustion of the gas generating agent;

the cup-shaped inner tube member having a bottom surface located in a bottom plate side of the diffuser shell, an opening portion located at a bottom plate of the closure shell and a ventilating portion formed at an end portion of the opening portion, for allowing a combustion product generated in the ignition device chamber to pass therethrough;

the igniter attached to the closure shell such that the igniter projects inside from a hole formed in the bottom plate of the closure shell;

the cup-shaped inner tube member fixed to an igniter attaching portion which includes a cylindrical portion projecting inwardly, and a passage for a combustion product formed between the cup-shaped inner tube member and the igniter attaching portion to reach the ventilating portion;

the combustion chamber having an outer circumferential surface formed by an outer circumference cylindrical member, an inner circumferential surface formed by the inner tube member, a bottom surface formed by the bottom plate of the closure shell and a top surface formed by a an annular porous member provided between the outer circumferential surface and the inner circumferential surface;

one end of an opening portion of the outer circumference cylindrical member located at the bottom plate of the closure shell;

the annular porous member having a plurality of holes which are smaller than the size of the gas generating agent, and the annular porous member being disposed such that a space is formed between the annular porous member and the bottom plate of the diffuser shell;

the space defined by the outer circumference cylindrical member, the bottom plate of the diffuser shell and the annular porous member;

a gas discharge path formed between the outer circumference cylindrical member and aside surface of the diffuser shell;

a total opening area ($A_1$) of the plurality of gas discharge ports is smaller than a total opening area ($A_2$) of a gas pathway extending from the combustion chamber to the gas discharge ports ($A_1 < A_2$); and the space and the gas discharge path being communicated with each other by a communicating portion formed on the other end of the opening portion of the outer circumference cylindrical member.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
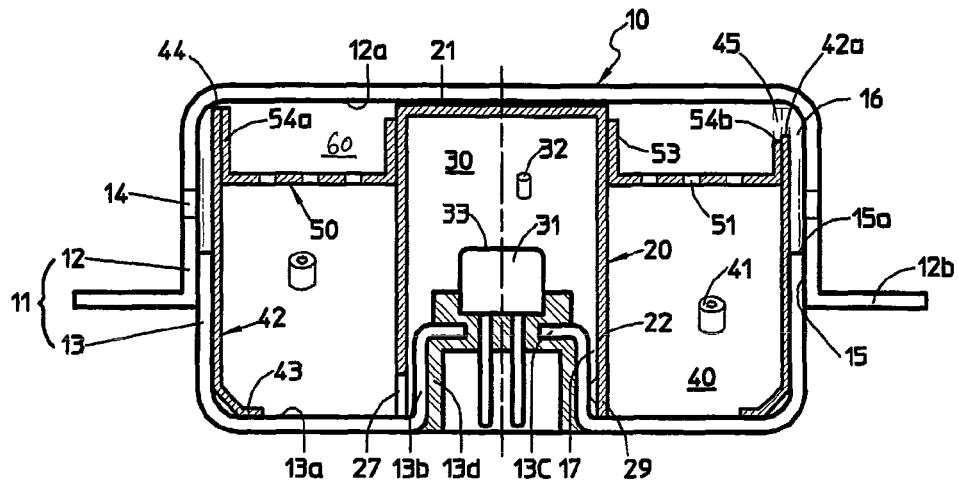
FIG. 1 shows an axial sectional view of a gas generator according to the present invention.

JP-U No. 3,004,037 still needs a second cooling filter 10 and a filter 11 and therefore cannot reduce the weight of a gas generator sufficiently.

The present invention provides a gas generator for a restraining device of a vehicle, which is capable of reducing the weight and the size of the entire gas generator by eliminating a filter for cooling and filtering combustion gas.

In the gas generator of the present invention, in the process of discharging the combustion gas, the combustion gas passes through the annular porous member and thereafter flows into the annular space to come into contact with an inner wall surface thereof. Subsequently, the combustion gas flows into the cylindrical gas discharge path and is discharged from the gas discharge ports while contacting a wall surface of the gas discharge path. Because the speed of the combustion gas flowing inside the gas generator can be inhibited at the gas discharge ports ($A_1 < A_2$), the time period, during which the combustion gas is in contact with wall surfaces forming the gas pathway, can be increased by controlling the time period during which the combustion gas passes through the gas pathway extending from the combustion chamber to the gas discharge ports.

Therefore, combustion residues contained in the combustion gas adhere to and are held by a contact surface each time the above-mentioned contact occurs, whereby the amount of combustion residues discharged from the gas discharge ports is reduced. For this reason, a massive filter that occupies a significant volume percentage of the gas generator can be eliminated, thereby contributing largely to reduction in size and weight of the entire gas generator. The filter discussed here is a filter that is disposed around a gas generating agent, and cools combustion gas of the gas generating agent and filters the combustion residues of the combustion gas. A filter that is disposed in the form of a cylinder around a gas generating agent (described in JP-A No. 2005-53382), and a filter that is disposed above a gas generating agent (described in the specification of U.S. Pat. No. 6,142,515) are examples. The gas generator of the present invention does not have any of such filters. Note that the combustion residues described in the present invention are derived from the metal components contained in the gas generating agent and are the same as "slag" described in JP-U No. 3,004,037.

The present invention preferably provides the gas generator for a restraining device for a vehicle, wherein the annular porous member has a first annular planar portion having a plurality of first holes, a first annular outside wall surface portion formed on an outer circumference of the first annular planar portion, and a first annular inside wall surface portion formed on an inner circumference of the first annular planar portion and on the same side as the first annular outside wall surface portion.

The present invention preferably provides the gas generator for a restraining device for a vehicle, wherein the annular porous member has a first annular planar portion having a plurality of first holes, a first annular outside wall surface portion formed on an outer circumference of the first annular planar portion, and a first annular inside wall surface portion formed on an inner circumference of the first annular planar portion and on a side opposite to the first annular outside wall surface portion.

When the annular porous member is fitted between the cup-shaped inner tube member and the outer circumference cylindrical member, the first annular outside wall surface portion abuts against the outer circumference cylindrical member, while the first annular inside wall surface portion abuts with the inner tube member, thus the annular porous member can be attached easily. Such abutment can be carried out with only one of the pair of the first annular outside wall surface portion and the outer circumference cylindrical member or the pair of the first annular inside wall surface portion and the inner tube member. Therefore, the space between the bottom plate of the diffuser shell and the annular porous member can be formed easily.

The present invention preferably provides the gas generator for a restraining device for a vehicle, wherein an annular gas collision member for trapping combustion residues is further disposed on the annular porous member in the space, the annular gas collision member has concave and convex surfaces forming a radial gas pathway, and the outside in the radial direction of the gas pathway is sealed at one of the concave and convex surfaces by a second annular outside wall surface portion formed on an outer circumferential portion of the annular gas collision portion, and the combustion gas of the combustion chamber collides with the annular gas collision member after passing through the holes of the annular porous member, and is discharged to the gas discharge path through the gas pathway that is not sealed.

By disposing the annular gas collision member between the bottom plate of the diffuser shell and the annular porous member, the time period during which the combustion gas contacts with the wall surfaces can be increased, enhancing the effect of capturing the combustion residues.

The present invention preferably provides the gas generator for a restraining device for a vehicle, wherein the outer circumference cylindrical member has, in the vicinity of the bottom plate of the diffuser shell, a communication portion for communicating the space and the gas discharge path with each other, and the gas discharge ports are formed closer to a side of the closure shell rather than the communication portion.

Because the communication portion and the gas discharges ports are disposed in the positional relationship described above, the contact area between combustion gas and the wall surfaces of the gas discharge path increases, whereby the effect of cooling the combustion gas and the effect of capturing the combustion residues are improved.

The present invention preferably provides the gas generator for a restraining device for a vehicle, wherein the flange portion extends from the side surface portion of the diffuser shell to the outside in the radial direction and exists on the imaginary straight line connecting the communication portion and the gas discharge ports.

Because the communication portion and the gas discharge ports are disposed in the positional relationship described above, the combustion gas that is ejected from the gas discharge ports is ejected downward (toward the closure shell side) instead of a direction perpendicular to the axial direction of the housing. As a result, since the flange portion exists on the imaginary straight line connecting the communication portion to the gas discharge ports, even when the combustion residues are contained in the combustion gas discharged from the gas discharge ports, the combustion residues can be captured since the combustion gas collides with the flange portion.

According to the gas generator of the present invention, the reduction in size and weight of the entire gas generator can be accomplished by eliminating a massive, large-volume filter.

The present invention can be used in a gas generator for a restraining device of a vehicle, such as an airbag apparatus mounted in various automobiles.

Figure 2:
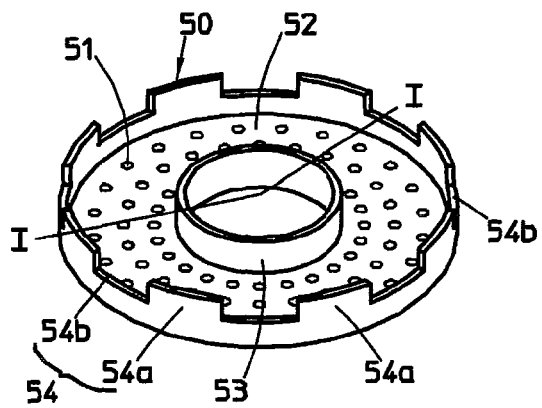
FIG. 2 shows a perspective view of a porous member used in FIG. 1.

Embodiments of the Invention (1) Gas Generator Shown in FIG. 1 and FIG. 2

FIG. 1 is a sectional view of a gas generator 10 in an axial direction. FIG. 2 is a perspective view of a porous member used in the gas generator shown in FIG. 1, and the porous member in FIG. 1 is shown in a sectional view taken along the line I-I of FIG. 2 in order to illustrate its shape clearly.

A housing 11 is obtained by welding and fixing a diffuser shell 12 and a closure shell 13 together at a contact portion. As shown in FIG. 1, in the housing 11, the contact portion is welded and fixed (welded/fixed portion 15) such that the closure shell 13 is fitted into the diffuser shell 12, and a step 15a shown in FIG. 1 is provided on an inner circumferential surface of the welded/fixed portion 15.

The diffuser shell 12 has a plurality of gas discharge ports 14 in its side surface portion, and the gas discharge ports 14 are sealed by an aluminum tape from the inside for prevention of moisture. The gas discharge ports 14 are formed in the vicinity of the closure shell 13 (closer to the welded/fixed portion 15), as shown in FIG. 1.

In the central part of a bottom plate 13a of the closure shell 13, an igniter attaching portion, that has a cylindrical portion 13b projecting toward an ignition device chamber 30 and an inward flange 13c extending inward from the cylindrical portion 13b. This attaching portion is formed integrally with the bottom plate 13a of the closure shell 13.

A cup-shaped inner tube member 20 is disposed in a central part of the housing 11. The inner tube member 20 is press-fitted to the igniter attaching portion (cylindrical portion 13b) such that a bottom surface 21 of the tube member is separated from a bottom plate (a top panel in the state shown in FIG. 1) 12a of the diffuser shell 12 and an opening portion 29 of the tube member abuts against the bottom plate 13a of the closure shell 13. Note that the bottom surface 21 may abut against the bottom plate (the top panel in the state shown in FIG. 1) 12a of the diffuser shell 12. And the opening portion 29 may be fixed to the igniter attaching portion by crimping or the like.

The inside of the inner tube member 20 is the ignition device chamber 30 accommodating the igniter 31 and an transfer charge (or a gas generating agent) 32 therein. The igniter 31 is accommodated in the ignition device chamber 30 coaxially with the central axis of the housing 11, has an ignition portion 33 accommodating the ignition charge therein and is integrally molded with the igniter attaching portion by using a resin 13d. Because the igniter 31 is disposed coaxially with the central axis of the housing 11, the igniter 31 contributes to the ignition property of the gas generating agent.

The opening portion 29 of the inner tube member 20 has a plurality of cutout portions formed by partially cutting a rim of the opening portion 29, and concave portions of the cutout portions and the bottom plate 13a of the closure shell 13 form a ventilating portion 27 for allowing a combustion product generated in the ignition device chamber 30 (flame, combustion gas, and the like) to pass through to a combustion chamber 40. Furthermore, a passage extending from the ignition device chamber to the ventilating portion is formed between the cylindrical portion 13b of the igniter attaching portion and a circumferential wall portion 22 of inner tube member 20.

An outer circumference cylindrical member 42, which is press-fitted to an inner wall surface of the closure shell 13, and an annular porous member 50, which is provided between the outer circumference cylindrical member 42 and the inner tube member 20, are disposed in a cylindrical space outside the inner tube member 20. And these members define the combustion chamber 40 charged with a gas generating agent 41. The porous member 50 has a plurality of holes 51 smaller than the size of the gas generating agent.

An outer circumferential surface of the combustion chamber 40 is formed by the outer circumference cylindrical member 42, an inner circumferential surface by the inner tube member 20, a bottom surface by the bottom plate 13a of the closure shell 13, and an upper surface by the annular porous member 50.

An opening end portion 43 on one end side of the outer circumference cylindrical member 42 is in the form of an inward flange and abuts against the bottom plate 13a of the closure shell 13, while an opening portion 44 on the other end is disposed at a distance from the bottom plate 12a of the diffuser shell. A lower section on a circumferential wall of the outer circumference cylindrical member is in contact to an inner circumferential wall surface of the closure shell 13. Here, a cylindrical gas discharge path 16 is formed between an upper section of a circumferential wall of the outer circumference cylindrical member 42 and an inner circumferential wall surface of the diffuser shell 12 by the step 15a formed in the vicinity of the welded/fixed portion 15. A rim of the opening portion 44 of the outer circumference cylindrical member 42 has a partially cutout portion 42a.

The annular porous member 50 has, as shown in FIG. 2, a first annular planar portion 52 having the plurality of holes 51, a first annular outside wall surface portion 54 formed on an outer circumference of the first annular planar portion 52, and a first annular inside wall surface portion 53 formed on an inner circumference of the first annular planar portion 52. The first annular outside wall surface portion 54 and the first annular inside wall surface portion 53 are formed so as to extend in the same direction with respect to the first annular planar portion 52.

Moreover, as shown in FIG. 1, the annular porous member 50 is fitted between the outer circumference cylindrical member 42 and the inner tube member 20, and an annular space 60 is formed by the annular porous member 50, the outer circumference cylindrical member 42, the inner tube member 20, and the bottom plate 12a of the diffuser shell.

The first annular outside wall surface portion 54 is created by forming eight convex portions 54a and eight concave portions 54b alternately in the circumferential direction, and forms, along with the cutout portion 42a of the outer circumference cylindrical member 42, a communicating portion 45 communicating the annular space 60 and the gas discharge path 16 with each other. The communicating portion 45 is formed closer to the bottom plate 12a of the diffuser shell 12 than the gas discharge ports 14. In other words, the gas discharge ports 14 are formed closer to the bottom plate 13a of the closure shell 13 than the communicating portion 45. As shown in FIG. 1, when the annular porous member 50 is fitted between the outer circumference cylindrical member 42 and the inner tube member 20, the communicating portion is formed by aligning the cutout portion of the outer circumference cylindrical member 42 with the eight concave portions 54b.

Figure 3:
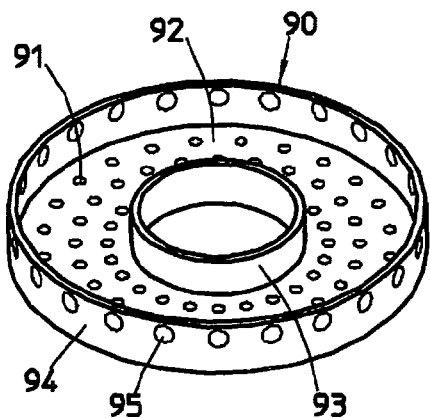
FIG. 3 shows a perspective view of the porous member in another embodiment.

The gas generator 10 of the present invention can use a porous member 90 shown in FIG. 3, in place of the porous member 50 shown in FIG. 2.

The annular porous member 90 has a first annular planar portion 92 having a plurality of holes 91, a first annular outside wall surface portion 94 formed on an outer circumference of the first annular planar portion 92, and a first annular inside wall surface portion 93 formed on an inner circumference of the annular planar portion 92. The first annular outside wall surface portion 94 and the first annular inside wall surface portion 93 are formed so as to extend in the same direction with respect to the first annular planar portion 92. A plurality of communication holes 95 are formed circumferentially with equal intervals in the first annular outside wall surface portion 94.

In the gas generator 10, the total opening area ($A_1$) of the plurality of gas discharge ports 14 is smaller than the total opening area ($A_2$) of the gas pathway ($A_1<A_2$). The total opening area of the gas pathway is the smallest cross-sectional area of the gas pathway extending from the holes 51 of the porous member 50 to the gas discharge ports 14, and indicates the smallest area out of the total opening area of the holes 51, the cross-sectional area of the communicating portion 45, the cross-sectional area of the space 60, and the cross-sectional area of the cylindrical gas discharge path 16.

An operation when the gas generator 10 shown in FIG. 1 and FIG. 2 is incorporated in a known airbag apparatus of a vehicle is described next.

When the igniter 31 is activated, the transfer charge (or gas generating agent) 32 is ignited and burnt by a flame generated from the ignition portion 33, whereby the combustion product (flame, combustion gas, and the like) is generated. The combustion product is released from the passage 17 into the combustion chamber 40 after passing through the ventilating portion 27, and then ignites and burns the gas generating agent 41.

Part of the combustion residues generated along with the gas generated from the gas generating agent 41 collide with the first annular planar portion 52 while passing through the holes 51 of the porous member 50, and the combustion residues adhere to and are held by the first annular planar portion 52.

The combustion residues that have passed through the holes 51 then collide with the bottom plate 12a of the diffuser shell when flowing into the annular space 60, and adhere to and are held by the bottom plate 12a.

The combustion gas that has flowed into the annular space 60 then collides with the first annular outside wall surface portion 54 (the convex portions 54a and the concave portions 54b) of the porous member 50 while flowing out of the communicating portion 45, and the combustion residues adhere to and are held by the first annular outside wall surface portion 54.

Thereafter, the combustion gas that has passed through the communicating portion 45 collide with the inner circumferential wall surface of the diffuser shell 12 opposing the communicating portion 45, whereby the combustion residues adhered to and are held by the inner circumferential wall surface.

Thereafter, the combustion gas passes through the gas discharge path 16, breaks the aluminum tape attached to the gas discharge ports 14, and is released from the gas discharge ports 14 to the inside of the airbag. At this moment, because the outer circumference cylindrical member 42 forms the communicating portion 45 in the vicinity of the bottom plate 12a of the diffuser shell, and the gas discharge ports 14 are formed closer to the closure shell side rather than the communicating portion 45, the combustion gas flowing out of the communicating portion 45 collides with the inner circumferential wall surface of the diffuser shell 12 easily, whereby the time period during which the combustion gas passes through the cylindrical gas discharge path 16 is increased, further improving the effect of capturing the combustion residues.

Because the relationship of $A_1<A_2$ is satisfied in the gas generator 10 of the present invention, the speed of the combustion gas flowing in the gas generator is suppressed by the gas discharge ports 14, and the time period, during which the combustion gas (and combustion resides) contacts with the wall surfaces of the gas pathway extending from the combustion chamber to the gas discharge port, is increased.

When the gas generating agent 41 within the combustion chamber 40 is burnt, the combustion gas repeatedly collides with a plurality of surfaces until being released from the gas discharge ports 14, and the combustion residues adhere to and are held by these surfaces. Thus, a filter for cooling and filtering the combustion gas is no longer needed.

Figure 4:
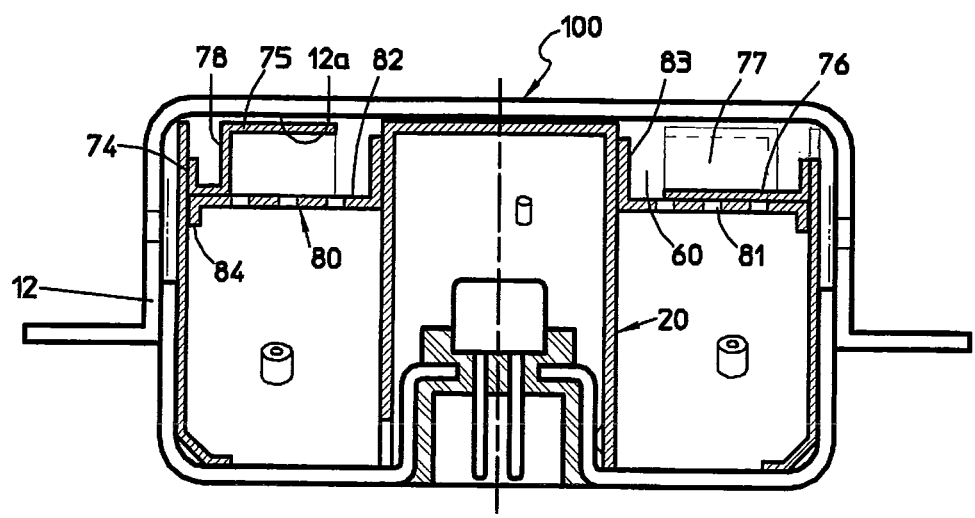
FIG. 4 shows an axial sectional view of a gas generator according to yet another embodiment of the present invention.
Figure 5:
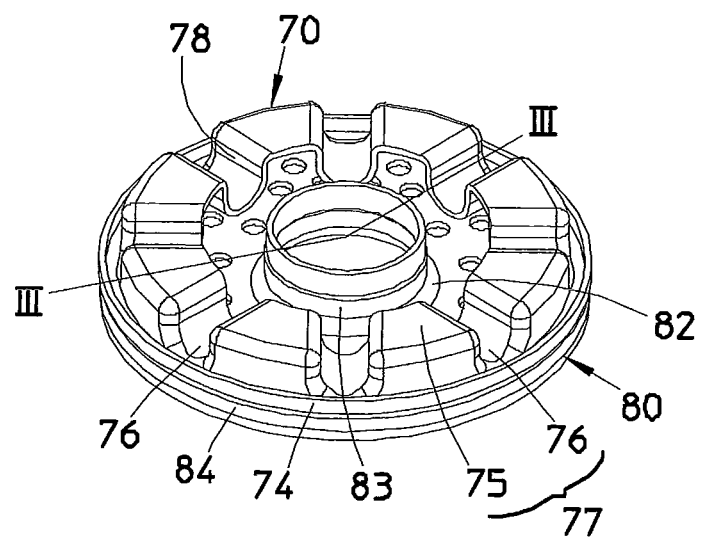
FIG. 5 shows a perspective view of a gas collision member disposed on the porous member and used in FIG. 4.

(2) Gas Generator Shown in FIG. 4 and FIG. 5

FIG. 4 is a sectional view of a gas generator 100 in an axial direction. FIG. 5 is a perspective view of a porous member in combination with a gas collision member 70 used in the gas generator shown in FIG. 4, but in FIG. 4, the porous member is shown in a sectional view taken along the line III-III of FIG. 5 in order to illustrate its shape clearly. The gas generator 100 shown in FIG. 4 is the same as the gas generator 10 shown in FIG. 1, except that a combination of an annular porous member 80 and a gas collision member 70 is used in place of the porous member 50.

The porous member 80 has a first annular planar portion 82 having a plurality of holes 81, a first annular outside wall surface portion 84 formed on an outer circumference of the first annular planar portion 82, and a first annular inside wall surface portion 83 formed on an inner circumference of the first annular planar portion 82. The first annular outside wall surface portion 84 is formed on the side opposite to the first annular inside wall surface portion 83, and the direction of the first annular outside wall surface portion 84 is opposite to the one shown in FIG. 2. The first annular outside wall surface portion 84 does not include the concave/convex wall surface in the axial direction as shown in FIG. 2, but has a uniform height.

The gas collision member 70 has a concave/convex surface 77 and a second annular outside wall surface portion 74 formed on an outer circumference of the concave/convex surface 77. The concave/convex surface includes a convex surface portion(s) 75 and a concave surface portion(s) 76 and forms a gas pathway in the radiation direction.

The convex surface portion 75 of the annular gas collision member 70 have the height corresponding to a side surface portion 78, and the inside of the convex surface portion 75 is formed into a tunnel-like shape in the radial direction such that the combustion gas that has passed through the holes 51 flows therein inwardly in the radial direction. Each concave surface portion 76 formed between two adjacent convex surface portions 75 allows the combustion gas colliding with the convex surface portions 75 to flow to the cylindrical gas discharge path 16, thus the cross-sectional shape thereof is not particularly limited as long as it does not inhibit the gas flow.

In the space 60, the gas collision member 70 is placed on the porous member 80 such that an inner rim of a central hole of the gas collision member 70 is spaced apart from the first annular inside wall surface portion 83. Although the gas collision member 70 is not fixed to the porous member 80, the abutment between the second annular outside wall surface portion 74 and the outer circumference cylindrical member 42 prevents the gas collision member 70 from being displaced. Furthermore, a predetermined gap is set between the concave surface portion 75 and the bottom plate 12a of the diffuser shell 12 in consideration of a tolerance of the construction parts.

An operation when the gas generator 100 shown in FIG. 4 and FIG. 5 is incorporated in a known airbag apparatus of a vehicle is described next.

When the igniter 31 is activated, the transfer charge (or gas generating agent) 32 is ignited and burnt by a flame generated from the ignition portion 33, whereby the combustion product (flame, combustion gas, and the like) is generated. The combustion product reaches the ventilating portion 27 after passing through the passage 17 and is released into the combustion chamber 40, and ignites and burns the gas generating agent 41.

Part of the combustion residues generated along with the combustion gas generated from the gas generating agent 41 collide with the first annular planar portion 82 while passing through the holes 81 of the porous member 80, and the combustion residues adhere to and are held by the first annular planar portion 82.

The combustion gas that has passed through the holes 81 then flows into the space 60 and partially collides with the convex surface portion 75, causing the combustion residues to adhere to and be held by the convex surface portion 75. The remaining residues collide with the bottom plate 12a of the diffuser shell, and as a result adhere to and be held by the bottom plate 12a. The combustion gas that has collided with the convex surface portion 75 changes its direction inward in the radial direction to hit the inner tube member 20 or the first annular inside wall surface portion 83, and further changes its direction to flow toward the communicating portion 45 through the concave surface portions 76. At this moment, the gas collision member 70 is moved upward by the pressure of the combustion gas, whereby the concave surface portions 75 abuts against the bottom plate 12a of the diffuser shell 12. Because the combustion gas changes its flow direction, the combustion residues adhere to the surfaces which the combustion gas collides with.

The combustion gas collides with the outer circumference cylindrical member 42 while flowing out of the communicating portion 45, causing the combustion residues to adhere to and be held by the outer circumference cylindrical member 42.

Thereafter, the combustion gas that has passed through the communicating portion 45 collides with the inner circumferential wall surface of the diffuser shell 12 opposing the communicating portion 45, causing the combustion residues to adhere to and be held by the inner circumferential wall surface.

Thereafter, the combustion gas passes through the gas discharge path 16, breaks the aluminum seal tape, and is released from the gas discharge ports 14 to the inside of the airbag. At this moment, because the outer circumference cylindrical member 42 forms the communicating portion 45 in the vicinity of the bottom plate 12a of the diffuser shell 12, and the gas discharge ports 14 are formed closer to the closure shell 13 side rather than the communicating portion 45, the combustion gas flowing out of the communicating portion 45 collides with the inner circumferential wall surface of the diffuser shell 12 easily, whereby the time period during which the combustion gas passes through the cylindrical gas discharge path 16 is increased, further improving the effect of capturing the combustion residues.

In addition, due to the positional relationship between the communicating portion 45 and the gas discharge ports 14, the combustion gas is ejected from the gas discharge ports 14 toward the direction (toward the bottom plate 13a side of the closure shell 13) lower than one perpendicular to the axial direction of the housing (horizontal direction). And since the flange portion 12b exists in this position (i.e., on the imaginary straight line connecting the communicating portion 45 and the gas discharge ports 14), the generated combustion gas collides with this flange portion, and consequently the combustion residues contained in the combustion gas adhere to the flange portion 12b. Note that the residues are captured not only by the flange portion 12b, for example, in the case where a retainer ring (not shown) for fixing the airbag is placed on the flange portion 12b when the gas generator is mounted in an airbag module, the combustion gas collides not with the flange portion 12b but with this retainer ring, and the combustion residues are captured.

Because the relationship of $A_1 < A_2$ is satisfied in the gas generator 100 of the present invention, the speed of the combustion gas flowing inside the gas generator is suppressed by the gas discharge ports 14, and the time period, during which the combustion gas (and the combustion resides) contacts with entire wall surfaces of the gas pathway, is increased.

When the gas generating agent 41 within the combustion chamber 40 is burnt, the combustion gas repeatedly collides with a plurality of surfaces until being released from the gas discharge ports 14, and the combustion residues adhere to and are held by these surfaces. Thus, a filter for cooling and filtering the combustion gas is no longer needed.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:
1. A gas generator for a restraining device of a vehicle, comprising:
a housing formed by a cup-shaped closure shell, a cup-shaped diffuser shell having a plurality of gas discharge ports on a side surface portion thereof, and a flange portion having a hole for fixing the gas generator;
a cup-shaped inner tube member disposed inside the housing, defining therein an ignition device chamber for accommodating an igniter coaxially with a central axis of the housing, and defining, in an outside thereof, a combustion chamber charged with a gas generating agent;
the cup-Shaped inner tube member having a bottom surface located adjacent to a bottom plate side of the diffuser shell, an opening portion located at a bottom plate of the closure shell and a first cutout portion formed at an end portion of the opening portion, for allowing a combustion product generated in the ignition device chamber to pass therethrough;
the igniter attached to the closure shell such that the igniter projects inside from a hole formed in the bottom plate of the closure shell;
the cup-shaped inner tube member fixed to an igniter attaching portion which comprises a cylindrical portion projecting inwardly, and a passage for a combustion product formed between the cup-shaped inner tube member and the igniter attaching portion to reach the first cutout ventilating portion;
the combustion chamber having an outer circumferential surface formed by an outer circumference cylindrical member, an inner circumferential surface formed by the inner tube member, a bottom surface formed by the bottom plate of the closure shell and a top surface formed by an annular porous member provided between the outer circumferential surface and the inner circumferential surface, the annular porous member being provided with a first annular planar portion having a plurality of first holes, and a first annular inside wall surface portion formed on an inner circumference of the first annular planar portion and abutting with the inner tube member;
a gas discharge path formed between the outer circumference cylindrical member and a side surface of the diffuser shell,
one end of an opening portion of the outer circumference cylindrical member located at the bottom plate of the closure shell, a rim of the other end opening portion of the other circumference cylindrical member having a second cutout portion;
the plurality of first holes being smaller than the size of the gas generating agent, and the annular porous member being disposed such that a space is formed between the annular porous member and the bottom plate of the diffuser shell;
the space defined by the outer circumference cylindrical member, the bottom plate of the diffuser shell and the annular porous member;
the space, along with the second cutout portion of the outer circumference cylindrical member, being communicated with the gas discharge path; and
a total opening area of the plurality of gas discharge ports is smaller than a total opening area of a gas pathway extending from the combustion chamber to the gas discharge ports to increase a time period during which the combustion gas is in contact with wall surfaces forming the gas pathway extending from the combustion chamber to the gas discharge ports by increasing a time period during which the combustion gas passes through the gas pathway,
wherein no means for cooling and filtering a gas generated by combustion of the gas generating agent is provided other than the annular porous member.

2. The gas generator for a restraining device for a vehicle according to claim 1, wherein the annular porous member has a first annular outside wall surface portion formed on an outer circumference of the first annular planner portion, and the first annular inside wall surface portion is on the same side as the first annular outside wall surface.

3. The gas generator for a restraining device for a vehicle according to claim 1, wherein the annular porous member has a first annular outside wall surface portion formed on an outer circumference of the first annular planner portion, and the first annular inside wall surface portion is formed on a side opposite to the first annular outside wall surface portion.

4. The gas generator for a restraining device for a vehicle according to claim 3, wherein
an annular gas collision member for trapping combustion residues is further disposed on the annular porous member in the space,
the annular gas collision member has concave and convex surfaces forming a radial gas pathway, and the outside in the radial direction of the gas pathway is sealed at one of the concave and convex surfaces by a second annular outside wall surface portion formed on an outer circumferential portion of the annular gas collision portion, and
the combustion gas of the combustion chamber collides with the annular gas collision member after passing through the holes of the annular porous member, and is discharged to the gas discharge path through the gas pathway that is not sealed.

5. The gas generator for a restraining device for a vehicle according to claim 1, wherein the outer circumference cylindrical member has, in the vicinity of the bottom plate of the diffuser shell, the second cutout portion for communicating the space and the gas discharge path with each other, and the gas discharge ports are formed closer to a side of the closure shell rather than the communication portion.

6. The gas generator for a restraining device for a vehicle according to claim 5, wherein the flange portion extends from the side surface portion of the diffuser shell to the outside in the radial direction and exists on the imaginary straight line connecting the second cutout portion and the gas discharge ports.

* * * * *